April 26, 1966 R. E. PENNELL 3,248,209
METHOD OF REACTING MIXED ACIDS AND AMMONIA
TO PRODUCE FERTILIZER MIXTURES
Filed Feb. 19, 1965 3 Sheets-Sheet 1

INVENTOR
ROBERT E. PENNELL
BY
Semmes & Semmes
ATTORNEYS

INVENTOR
ROBERT E. PENNELL

BY
Semmes & Semmes
ATTORNEYS

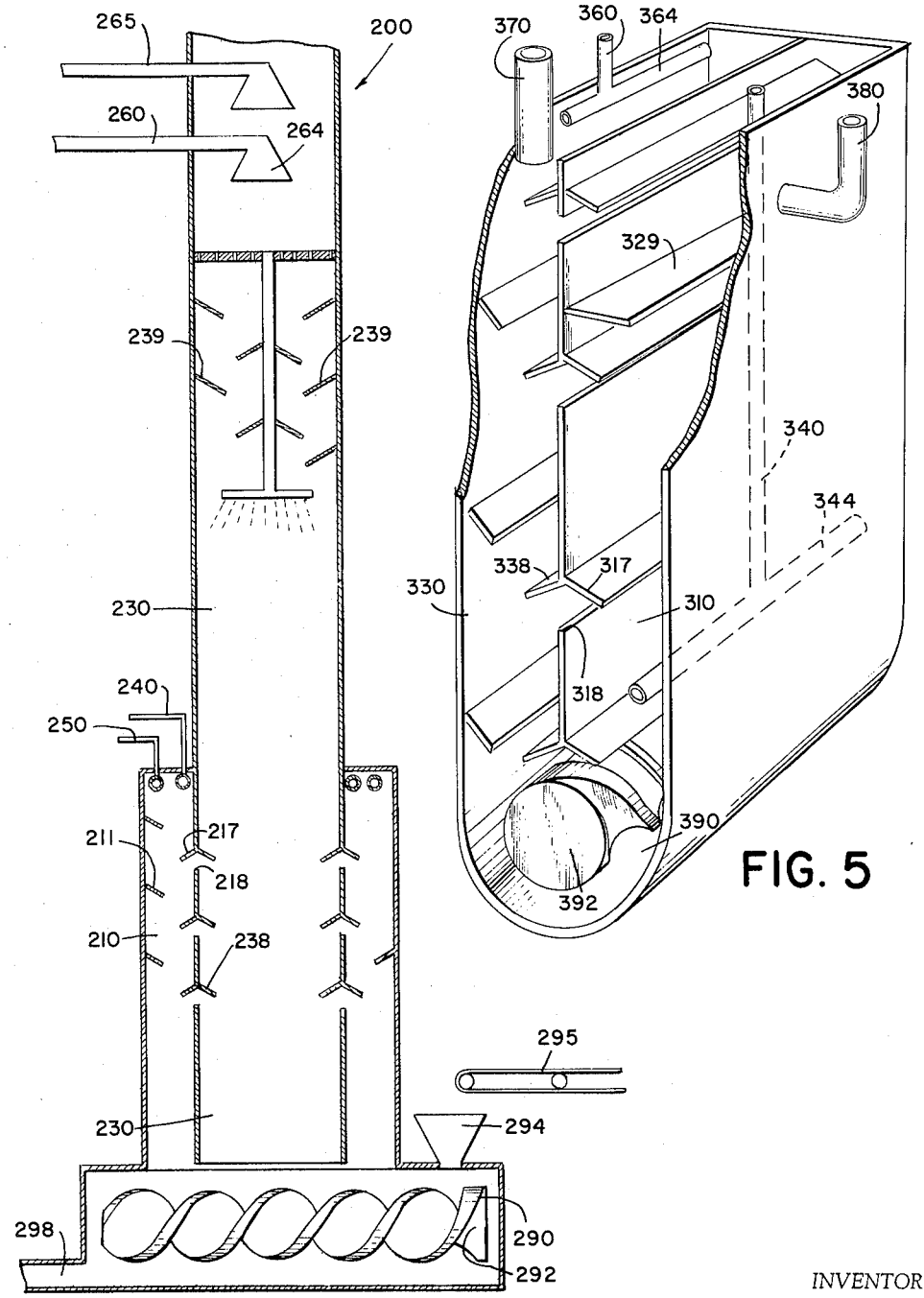

United States Patent Office 3,248,209
Patented Apr. 26, 1966

3,248,209
METHOD OF REACTING MIXED ACIDS AND AMMONIA TO PRODUCE FERTILIZER MIXTURES
Robert E. Pennell, P.O. Box 33, Anderson, S.C.
Filed Feb. 19, 1965, Ser. No. 433,987
9 Claims. (Cl. 71—43)

The foregoing specification and drawings are a continuation-in-part of co-pending Application 347,136, filed February 25, 1964, now abandoned, which is in turn a continuation-in-part of applications: 243,229, filed December 10, 1962; 120,115 filed June 1, 1961, and now abandoned; and 828,035, filed July 20, 1959, now abandoned; the priorities of which are hereby claimed.

This invention describes equipment and steps for controlling an exothermic chemical reaction. Disclosed herein are steps and apparatus for reacting volatile ammonia with concentrated acids and with phosphates to produce dry, useful ammonium salts.

*The problem*

A method of producing useful nitrogen materials or ammonium salts comprises combining free ammonia with an acid. However, reacting strong acids and bases to obtain salts customarily produces dangerously high heat. Thus, heat given off upon mixing volatile ammonia with an acid is an old inherent problem. Valuable nitrates are decomposed and their values destroyed by elevated temperatures in the presence of acids. In order to keep heat at an acceptable level, reactions have been attempted with dilute ammoniating solutions containing approximately 20% water and acid solutions containing approximately 22% water. Besides having negative effects on the moisture content of the desired dry product, resonable quantities of water alone have been found insufficient to absorb the immense heat of reaction.

Considerable decomposition of valuable nitrogen materials has been experienced. Disadvantages exist not only in the economic loss of valuable decomposed ammonium nitrates, but also in the serious commercial consequences of producing an indefinite product. Moreover, omnipresent dangers of fire and explosion to equipment and to personnel are hazards.

Early attempts in reacting an ammoniating solution with sulphuric acid included use of horizontal cylinders. Ammoniating solution and acid were introduced simultaneously through separate perforated pipes extending substantially the length of the cylinder. Those efforts, however, have proved unsatisfactory. When 93% sulphuric acid was used in pre-existing processes, nitrate breakdown was so severe that the reacting masses often caught fire, resulting in very serious nitrogen losses. Heat of reaction between the acid and ammonia is so great that the hazard of nitrogen loss through decomposition of ammonium nitrate is an imposing economic and safety hazard.

In the fertilizer industry, some manufacturers now are using pre-neutralizing equipment, which consist of upright tanks. Into the tanks ammoniating solution and acid are introduced simultaneously through perforated pipes or sparges positioned near the bottoms of the tanks. Water is introduced continually to keep temperatures below the disintegration point of ammonium nitrate. Even then, some breakdown of the nitrates occur, and fire dangers are present when concentrations get too high. Accurate control is difficult.

Localized reactions at points of entry of acid and ammonia into the pre-neutralizers raise temperatures at those points above the overall average temperature of the reacting masses. Localized high temperatures cause localized nitrate breakdown. Moreover, the temperature of ammonium nitrate decomposition drops rapidly as acid concentration increases. Thus, near the acid inlet where acid is relatively concentrated, undue nitrate losses occur.

*The invention*

The present invention proposes the use of separate chambers for stripping free ammonia from an ammoniating solution and for reacting volatile free ammonia with an acid. Thus, heat produced by acid-base reaction is shielded from contacting valuable combined nitrates in the ammoniating solution. As a result, nitrate breakdown is avoided. Through the use of separate stripping and reacting columns, a portion of available uncombined ammonia is retacted with acid in a reacting zone, separated from the vulnerable ammonium nitrate in the ammoniating solution. The acid-ammonia reaction is completed in a mixer, and a remaining portion of ammonia reacts with phosphates introduced in the mixer. At the same time, ammonium nitrate is distributed uniformly throughout the bulk fertilizer materials. The acid-base, salt producing reaction is completed in the mixer in the presence of moving bulk materials, which absorb and dissipate heat of reaction.

Circular or rectangular stripping and reacting columns may be used. However, a rectangular type is proposed as being better adapted to existing continuous or batch mixers used in most fertilizer plants.

Described herein is the production of high nitrogen fertilizers as well as the production of fertilizer materials in which nitrogen is derived in part or totally from an ammoniating solution. The ammoniating solution used in the novel step contains uncombined free ammonia. One available solution comprises 19% uncombined ammonia, 72.5% ammonium nitrate and 8.5% water. Some of the ammoniating solutions now on the market contains urea, and some are solutions of ammonium nitrate in anhydrous ammonia with less than 1% water. The novel process and equipment described herein envisions use of any commercially available solutions.

Sulphuric or phosphoric or other acids are reacted with the uncombined ammonia of the ammoniating solution. The ammonia and acid reaction takes place in part or fully in a zone separated and heat shielded from the vulnerable ammonium nitrate and urea contained in ammoniating solutions.

In a batch plant acid and solution may be introduced uniformly over a given period of time. In a continuous operation plant, ammoniating solution and concentrated acid are continuously introduced in separate chambers. The high heat from the acid-ammonia reaction in the reaction section is transmitted through the partition separating the reaction and stripping sections, warming the ammoniating solution and stripping uncombined ammonia therefrom. Stripped gas passes into the reaction zone and the stripping and reacting mutually perpetuate each other.

The products of the stripping section and of the reacting section are combined in a mixer supporting and communicating with the two chambers comprising the ammoniator. Reaction is completed in the mixer in the presence of other materials such as phosphates and recycled screenings. Introduction of the bulk phosphates and recycled materials is controlled and regulated for complete reacting of phosphates with ammonia passed directly into the mixer.

Through the use of a separately zoned stripping and reacting ammoniator, hazards of decomposing ammonium nitrate and breaking down other decomposable salts in fertilizer are avoided. A strong acid may be used; sulphuric acid of a concentration of from 77 to 93% for phosphoric acid of 75% concentration may be employed safely without appreciable breakdown of ammonium nitrate or of other decomposable salts. Using concentrated acid results in minimum water carry over in products discharged from the mixer.

Objectives

This invention has as one of its objectives controlling exothermic chemical reactions.

Another object of the invention is the controlled combining of acids and bases.

Another objective is a continuous process for the production of diammonium phosphate and ammonium phosphate products in which the ammonia of the ammoniating solution reacts with the acid in two stages. The first stage reaction takes place separately from any ammonium nitrate or other decomposable salts, controlling the ammonia volatilized and acid-ammonia reaction by vertically adjusting points of solution introduction, the second stage in reaction taking place in a cooler zone where other materials enter into the reacting mass and where the moisture content is low, and where such remaining water may enter as water of hydration in double salt formations through introduction of anhydrous magnesium sulphate thus eliminating the drying step.

Another objective is the process of reacting ammonia of the ammoniating solution with an acid in a separate zone from ammonium nitrate and other salts which facilitates maximum removal of water before these salts enter the mixture when water evaporation becomes much more difficult.

Another objective is in the providing of the initial steps in continuous simplified granulating and prilling. In high nitrogen production the fluidity of the resultant products from the stripping-reactor is maintained with low water content, and on adding anhydrous magnesium sulphate such water enters as water of hydration in double salt formations of $MgSO_4.(NH_4)_2SO_4.6H_2O$ and $K_2SO_4.MgSO_4.6H_2O$ with required fluidity for prilling and granulating direct without the necessity of going through the drying stage.

Since breakdown or decomposition of ammonium nitrate is severe in the presence of both acid and heat, one other objective of this invention is the physical separation of vulnerable ammonium nitrate of an ammoniating solution from the dangerous combination of acid employed for reacting with ammonia and heat produced by reaction.

Further objects of the invention will be apparent from the specification and from the drawings.

In the drawings:

FIGURE 4 is a side elevation of a circular ammoniator stack placed on a mixer.

FIGURE 5 is a cut away perspective of a combined ammoniator and mixer.

Description

Figure 1:
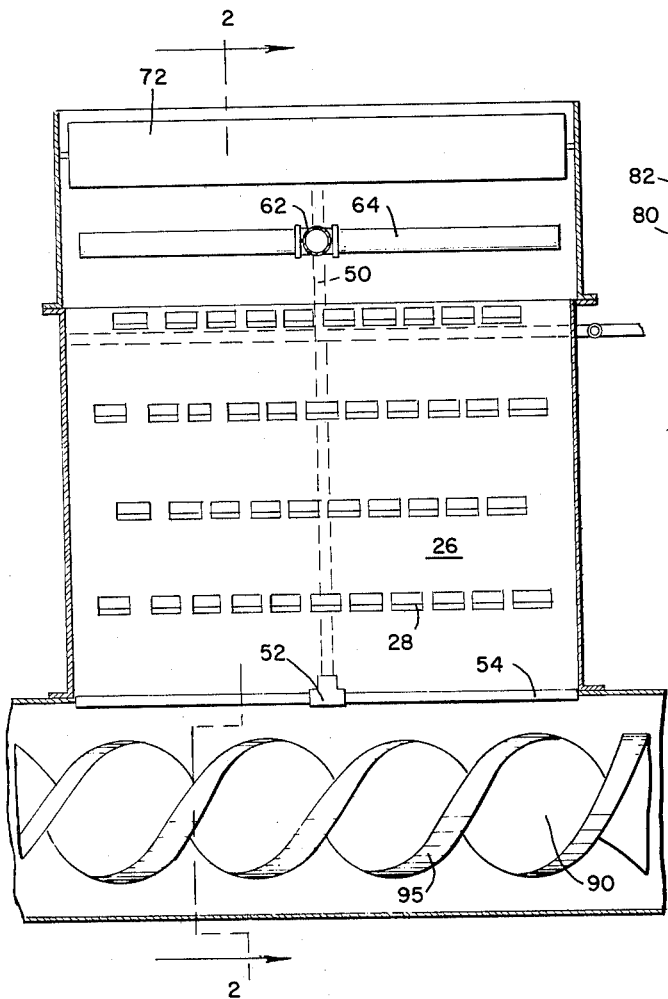
FIGURE 1 is a cross sectional side elevation of a rectangular ammoniator superimposed on an elongated continuous screw mixer.
Figure 2:
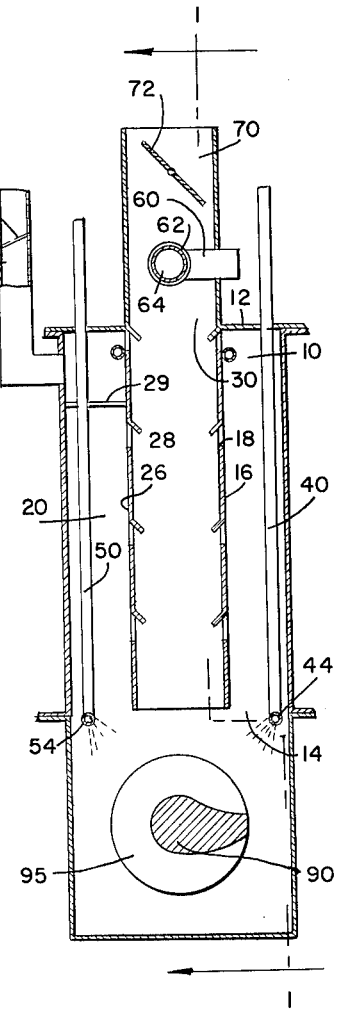
FIGURE 2 is a cross sectional end elevation of the ammoniator mixer apparatus shown in FIGURE 1.

Referring to FIGURES 1 and 2, an ammoniator comprises three rectangular parallel columns generally referred to by numerals 10, 20 and 30.

The upper extremity of channel 10 and 20 are closed by cover 12 to prevent loss of free ammonia, however, the lower end 14 of channel 10 and 20 are open, permitting free flow of the ammoniating solution into a mixer below. Walls 16 and 26 respectively define openings 18 and 28 which permit the passage of gaseous materials from external columns 10 and 20 into central column 30.

Ammoniating solution containing free ammonia dissolved in ammonium nitrate and water is directed through vertically adjustable pipes 40 and 50 and is exhausted through perforated horizontal pipes 44 and 54. The greater part of the acid-ammonia reaction takes place in the reaction section, into which volatilized ammonia is passed by means of the rapid expansion of the ammonia and by the slight updraft in the reaction section. The high reaction heat from the acid-ammonia reaction strips ammonia from the ammoniating solution introduced in the stripping section. The ammonia expansion has a cooling effect in the stripping section which partially offsets the reaction heat transmitted to the stripping section. Gaseous ammonia rises in columns 10 and 20 and passes through shielded openings 18 and 28 into the central column 30.

Concentrated acid is introduced through pipe 60 and perforated header 64. As the acid precipitates downward through chamber 30, it reacts with the ammonia, producing an ammonium salt, and releasing a great quantity of heat. Heat of reaction is dispersed through walls 16 and 26, where it warms chambers 10 and 20, heating ammoniating solution, and therefrom stripping free ammonia.

Exhaust vent 70 passes water vapor released from the acid. Damper 72 controls the rate of venting. When ammoniating solution is introduced only through pipe 40 into chamber 10 or when a dilute acid or ammoniating solution is employed, auxiliary vent 80 may be opened by damper 82 to remove excess vapor. Use of the auxiliary vent 80 requires inserting baffle 29 over the entire length of chamber 20 to prevent loss of ammonia. Thus, free ammonia may not escape through the auxiliary vent without passing through the acid bath in chamber 30.

Bulk materials containing phosphates are introduced at one end of mixer 90 and are moved by continuous blade 95. The ammoniating solution is sprayed from perforated pipes 44 and 54 directly into the mass, and a part of the free ammonia remaining in the solution reacts with the phosphates. In the mixer, acid-base reaction is completed in the presence of the temperature dispersing bulk materials. By selectively raising and lowering vertical pipes 40 and 50, the ratio of stripped ammonia to that passing directly into the bulk materials may be regulated. The higher heads 44 and 54 are positioned, the greater chance ammonia has to be stripped from the ammoniating solution.

Figure 3:
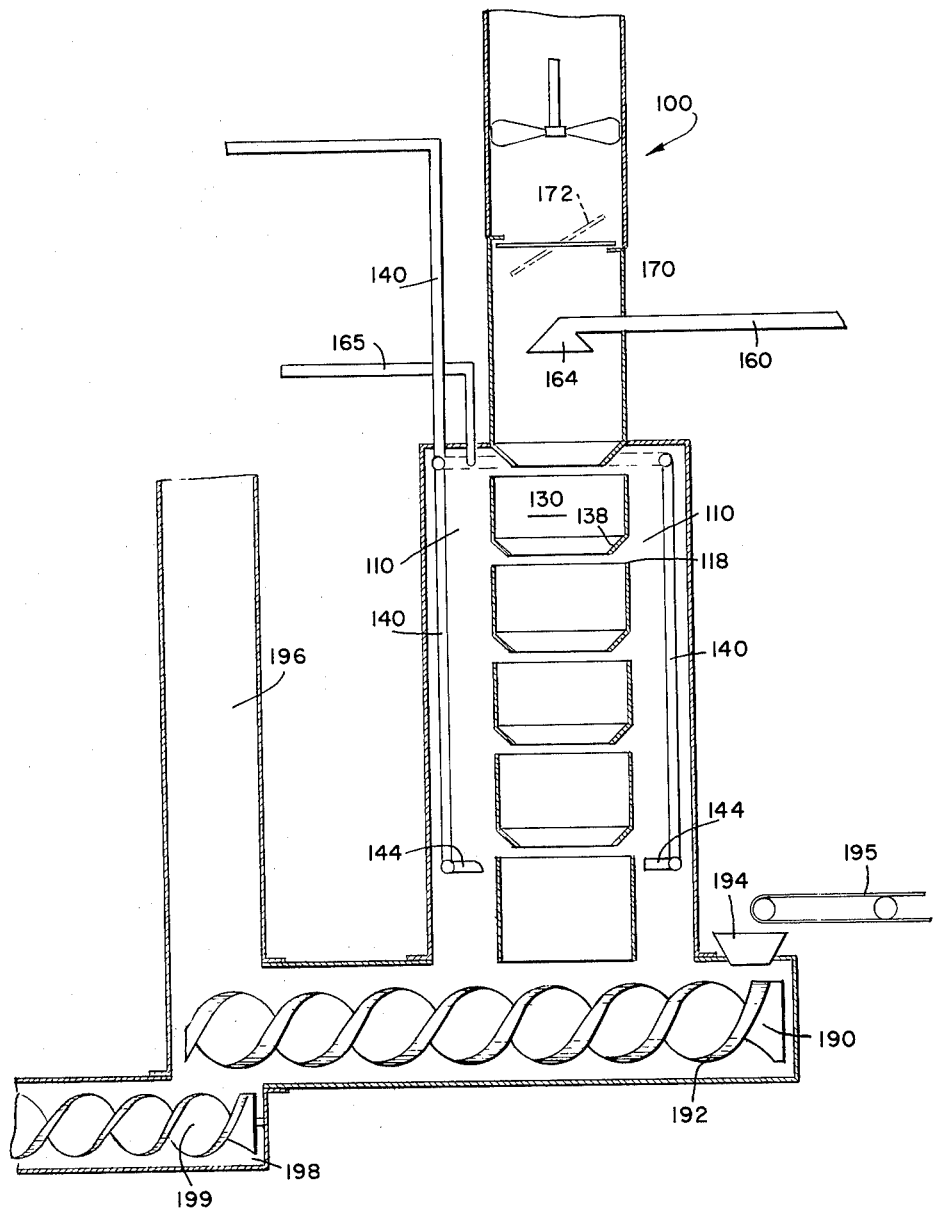
FIGURE 3 is a cross sectional side elevation of a circular ammoniator superimposed on a screw mixer.

FIGURE 3 illustrates an early embodiment of the apparatus using concentric cylindrical chambers 110 and 130 as an ammoniator. Ammoniating solution is introduced through helical pipe 140 and to perforated circular pipe 144. Some free ammonia leaves the solution in passes through apertures 118 into column 130. Pipe 160 and nozzle 164 precipitate acid through the central column. Stack 170 and damper 172 vent undesirable water vapor. Pipe 165 has been added as a safety measure to conduct pure water into the chamber in the event of emergencies.

When a volatile acid such as hydrochloric acid or nitric acid is used, damper 172 should be closed, forcing a downdraft through reacting column 130, and exhausting water vapor through stack 196.

Bulk materials are received in intake 194 and urged onwardly by spiral blade 192, and mixer 190 passes bulk materials horizontally beneath the cylindrical columns. Auxiliary vent 196 may be used in conjunction with vent 170 or in lieu of vent 170. After the materials have been mixed thoroughly, feed 198 and blade 199 continue to pass the nitrogenated bulk materal to storage.

In FIGURE 4 another early embodiment of the invention is disclosed. Cylindrical stripping chamber 210 surrounds the lower portion of reacting chamber 230. Baffles 211 slow the descent of ammoniating solution released from circular pipes 240 and 250. Acid is introduced through pipe 260 and is precipitated from nozzle 264; baffles 239 finely divide the descending acid. Deflectors 217 and 238 ensure that only the gaseous nitrogen passes through openings 218 between the chambers. Bulk materials from intake 294 and conveyor 295 are drawn into mixer 290. Those materials together with ammoniating solution, free ammonia, ammonium salts are produced by the acid-ammonia reaction and small amounts of acid are mixed by blade 292 and urged through restricted outlet 298. Baffling may be eliminated in a tall reacting column which provides for maximum water evaporation.

As indicated, FIGURE 5 illustrates the initially conceived apparatus with recent improvements. Here two parallel rectangular columns 310 and 330 are separated by the single walls indicated. An ammoniating solution is conducted to pipe 340 and distributed through perforated horizontal vertically adjustable pipe 344 near the bottom of chamber 310. Acid is introduced by perforated pipe 364 near the top of chamber 330. Ammonia passes upwardly and into chamber 330 through openings 318 which are shielded by deflectors 317 and 338. Vent 370 controllably releases water vapor. Mixer 390 communicates directly with the bottom of channel 310 and 330 and blade 292 propels bulk materials and reagents to the mixer. An auxiliary moisture vent 380 is supplied in the ammoniating column. However, the vent is restricted from communication with free ammonia by full length baffle 329.

*Example A*

Approximately 1,100 parts of ammoniating solution containing 19% free ammonia, 72.5% ammonium nitrate and 8.5% water were introduced in a stripping section of an ammoniator, simultaneously with the introduction of approximately 674 parts of 94% sulphuric acid in an adjacent reaction section. Three hundred parts of anhydrous calcium-magnesium sulphate and 100 parts of Dolomite were introduced in a subjacent mixer. Mixing was continued through crystallization and setting. A dry granular material having a 19.88% nitrogen content was produced. No appreciable breakdown of ammonium nitrate occurred.

*Example B*

The following procedure was used in mixing a two thousand pound batch of high nitrogen fertilizer. A stripping-reactor ammoniator was positioned atop a continuous spiral blade-mixer, similar to the combination shown in FIGURES 1 and 2 of the drawings. Ingredients were added in the below listed quantities:

| | Lbs. |
|---|---|
| Ammoniating solution | 267 |
| 24.0% ammonia (64 lbs.) | |
| 75.6% ammonium nitrate | |
| 0.4% water | |
| (Total nitrogen 46%) | |
| 92.3% concentrated sulphuric acid | 95 |
| Super phosphate | 840 |
| 20% $P_2O_5$ | |
| 9% moisture | |
| Muriate of potash | 200 |
| 60% $K_2O$ | |
| Less than 1% moisture | |
| Silica filler | 598 |
| Less than 1% moisture | |
| | 2,000 |

Materials had been stored at normal atmospheric temperatures.

Ammoniating solution was introduced through a perforated pipe positioned at its lowest point in a stripping column. Perforations in the pipe directed the solution into the throw of mixer blades for direct ammoniation of super phosphate. A second ammoniating solution introduction pipe was positioned in the lower quarter of a stripping column above throw of mixer blades, stripping ammonia for acid-ammonia reaction. A damper in the vent of a reaction column was open for release of water vapor.

The ammoniator was mounted near where premixed dry materials entered the mixer. The mixer was started, and, as a charge of the dry materials reached the ammoniator, a signal light flashed on and remained on until the last of the charge passed under the ammoniator. While the signal light was on, the required amount of solution was introduced uniformly through the perforated pipes. At the same time required acid was introduced high in the reacting column.

Thirty-one pounds of free ammonia was stripped from solution and was reacted with the sulphuric acid in the ammoniator and in the mixer. The remaining thirty-three pounds of free ammonia from the ammoniating solution was consumed in the ammoniation of super phosphate within the mixer.

At the end of one and one half minutes, the signal light turned off, indicating that the entire charge of dry materials had passed beneath the ammoniator; mixing was completed. The product was well grained in uniform small grains and indicated 3.66% moisture and 5.92% nitrogen. Results proved no appreciable loss of ammonia. During the reacting and mixing processes, maximum temperature reached in the reaction section was 350° F., maximum temperature in the stripping section was 225° F. and temperatures from 175° to 200° F. were experienced in the mixer.

Stripped ammonia, or ammonia capable of being stripped from ammoniating solution should never be in excess of that required for producing the normal salt of the acid employed.

*Example C*

In another example reaction was carried on between acids and ammoniating solutions without mixing bulk super phosphates. Procedure and apparatus were similar to Example B, with the exception that a single horizontal perforated pipe was used to introduce ammoniating solution and damper 29 FIGURE 2, closed off the second stripping section. Because a relatively dilute acid was employed, an auxiliary exhaust was provided at a point removed from the stripping section. The ammoniating solution was introduced and precipitated from a point just beneath the vertical center of stripping column. Acid was precipitated from high in an adjacent reacting column and was cascaded over baffles adjacent to apertures communicating the stripping and reacting columns. Materials employed were:

| | Grams |
|---|---|
| Ammoniating solution: | 4000 |
| 24% free ammonia (960 grams) | |
| 70% ammonium nitrate (2800 grams) | |
| 6% water (240 grams) | |
| Acid: | 3572 |
| 85%–77.4% concentrated phosphoric acid | |
| 15%–77.4% concentrated sulphuric acid | |

Ninety-eight percent sulphuric acid was diluted with water to produce a 77.4% acid. The hot diluted sulphuric acid was added to 77.4% phosphoric acid. The temperature of the mixed acid, originally 130° F., had dropped to 100° F. before the process began. Temperature of the ammoniating solution was 38° F. Ambient temperature was 43°. Prior to starting the test, a quantity of ammoniating solution and acid was stripped and reacted in the reactor in order to bring the temperature of the equipment to normal operating conditions.

Mixer and ammoniator were emptied before 4000 grams of ammoniating solution and 3572 grams of mixed acids were introduced uniformly over a period of 2 minutes 7 seconds. The product comprising a thin slurry at 220° F. weighed 15.5 pounds. A loss of 1.22 pounds of the original materials was mainly water. Moisture in the product was found to be 7.75% immediately after the first weighing. No decomposition of ammonium nitrate was encountered. Maximum temperature reached in the reaction section was 280° F.; 160° F. was recorded in the stripping section.

The thin slurry was periodically mixed until crystalization was complete. The product was in good condition for prilling or granulating. The mixture of di-ammonium phosphate, ammonium nitrate and ammonium sulphate has low hydroscopic qualities.

At the same time the moisture sample was taken, a two kilogram portion was separated and was mixed with 140 grams of anhydrous magnesium sulphate. Water from the slurry was taken up as water of hydration in a double salt formation of ammonium sulphate and magnesium sulphate, $(NH_4)_2SO_4$—$MgSO_4$—$6H_2O$.

Apparatus as shown in FIGURE 5 may be used in the above example. That construction may also be used to advantage when employing dilute acids where maximum elimination of water is desirable.

In another example, 3572 grams of 77.4% phosphoric acid was reacted with 4000 grams of ammoniating solution. Using the same method, time, and rate of introduction of acid and ammoniating solution as employed in Example C, diammonium phosphate and ammonium nitrate were produced. Apparatus as shown in FIGURE 5 was used. As in the case of sulphuric acid reaction in which the acid salt, ammonium bisulphate, is produced by reacting ammonia and sulphuric acid, and excess acid produces the normal salt, ammonium sulphate; when using phosphoric acid, the acid salt, monoammonium phosphate is produced, with an excess of ammonia reacting with the acid to produce the normal salt, diammonium phosphate.

When using phosphoric acid for reacting with an ammoniating solution, apparatus as shown in FIGURES 1 and 2 may be used. One-half of the ammoniating solution may be introduced directly into the moving bed in the mixer. The remaining half of the solution is introduced above the moving bed. That remaining half of the solution is stripped or partially is stripped of ammonia for reacting with acid which is continually introduced into and near the top of the reaction section. The total acid introduced is proportioned for reacting with the total uncombined ammonia of the solution. Acid and ammonia are controlled for continuous and regulated introduction.

Stripping sections and mixers preferably operate with temperatures in a range of 160 to 300 degrees; temperatures in reaction sections should be below the breaking points of salts produced in acid-ammonia reactions. While ammonia is stripped in sufficient quantities to form at least acid salts (ammonium bisulphate and monoammonium phosphate), some of the normal salts also are formed.

Distinctions in concentration of acids require vertical adjustment of the perforated headers for distributing ammoniating solution. When weak acids are used a greater part of the acid-ammonia reaction should occur in the reaction section, producing increased heat to vaporize and exhaust excess water.

When concentrated acid is employed, the stripping and reacting columns create products having so little moisture that the addition of anhydrous magnesium sulphate completely dries the products. Thus, expensive and prolonged evaporating and drying steps which heretofore have been considered indispensible are obviated. A completely dry product results with that addition of less than ten percent magnesium sulphate.

Anhydrous magnesium sulphate as referred to in this application means freshly dehydrated magnesium sulphate in which the last molecule of water is broken off or the term defines a completely dehydrated product which has been sealed from possible water absorption up to the time of using.

Although this invention has been described by particular examples of processes and apparatus, it will be obvious to one skilled in the art that the herein disclosed teachings may be employed without departing from the scope of invention. Thus, the limits of the invention are precisely defined only in the appended claims.

I claim:

1. A process of reacting phosphoric acid with the uncombined ammonia of an ammonia-ammonium nitrate solution comprising introducing the ammoniating solution into a stripping column, adjusting vertically the points of introduction of said solution as to strip substantially half of the uncombined ammonia of the solution by heat of the acid-ammonia reaction, passing vaporized ammonia through shielded openings into an adjacent communicating reaction column through the top of which phosphoric acid is being continuously and proportionately introduced and distributed downward reacting with the said vaporized ammonia, producing substantially mono-ammonium phosphate, venting vapor developed through reaction column exhaust stack, discharging the partially stripped ammoniating solution from the stripping section and the mono-ammonium phosphate from the reaction section into a mixer into which mixer additives and recycle fines are continuously and proportionately introduced and propelled forward beneath the attached stripping-reactor columns, combining, mixing and reacting products from the stripping and reaction sections to complete the acid-ammonia reaction thus producing a material of substantially di-ammonium phosphate-ammonium nitrate.

2. The process of claim 1 in which the monoammonium phosphate and ammonium nitrate is the end product, and substantially one-half of the acid-ammonia reaction takes place in the reactor column with the remainder of the acid-ammonia reaction taking place in the mixer.

3. The process of claim 1 in which the potassium sulfate and anhydrous magnesium sulphate are introduced as additives in the mixer to form potassium magnesium sulphate in required amount for entering water present as water of hydration in the double salt $K_2SO_4 \cdot MgSO_4 \cdot 6H_2O$ formed in the mixer along with the di-ammonium phosphate-ammonium nitrate produced, thus eliminating the drying step.

4. The process of claim 1 in which the phosphoric and sulphuric acids are employed producing mono-ammonium phosphate and ammonium-acid-sulphate in the reaction column, producing a final product of di-ammonium phosphate-ammonium sulphate-ammonium nitrate in the mixer.

5. The process of claim 4 in which the freshly dehydrated magnesium sulphate is introduced as an additive in the mixer, the sulphuric acid employed and anhydrous magnesium sulphate introduced being of sufficient quantity to produce ammonium magnesium sulphate and in at least required amounts for hydration the double salt to $$(NH_4)_2SO_4 \cdot MgSO_4 \cdot 6H_2O$$

with water present in the mixer, thus producing a material of di-ammonium phosphate, ammonium nitrate, and hydrated ammonium magnesium sulphate, thus eliminating the drying steps.

6. A process of using an acid selected from the group of phosphoric acid and sulphuric acid for reacting with an ammoniating solution of substantially uncombined ammonia, comprising introducing the solution into the stripping column of the stripping-reactor, adjusting vertically the points of introduction of said solution as to volatilize and expand substantially one-half of the ammonia through shielded openings into an adjacent communicating reaction column through the tops of which the acid is being continuously and proportionately introduced and distributed downward, reacting said ammonia with the acid producing substantially the acid salt, venting vapor developed through reaction column exhaust stack, discharging products from the stripping column and from the reaction column into the communicating mixer to which the stripping-reactor columns are attached and into which mixer additives and recycle fines are continuously and proportionately introduced and propelled forward beneath the attached stripping-reactor columns, combining and mixing with the reacting products from the stripping and reaction columns, completing the acid-ammonia reaction to produce the normal salt of the acid and ammonia.

7. The process of claim 6 in which a dilute acid is employed comprising reacting greater than half of the ammonia of the solution with the acid introduced in the reaction column, thus forming the acid and the normal salt of the acid, vertically adjusting points of solution introduction, controlling formation of the normal salt below the point of clogging reactor column, cascading descending acid through column, employing the lateral auxiliary exits near top of reaction column, thus facilitating water volatilization and removal.

8. The process of claim 6 in which a phosphate material and a potash material be included in the additives introduced into the mixer producing a fertilizer containing nitrogen, phosphorus, and potash.

9. The process of claim 6 in which the ammoniating solution is divided into two parts and introduced simultaneously into each of two separate similar stripping columns attached to and communicating with said reaction column.

References Cited by the Examiner
UNITED STATES PATENTS

| | | | |
|---|---|---|---|
| 1,735,107 | 11/1929 | Claude et al. | 23—289 |
| 2,566,107 | 9/1951 | Kassel | 260—449.6 |
| 2,999,015 | 9/1961 | Mortenson et al. | 7—43 |
| 3,008,801 | 11/1961 | Adams | 23—107 |
| 3,125,420 | 3/1964 | Coon et al. | 23—259.1 |

References Cited by the Applicant
UNITED STATES PATENTS

| | | |
|---|---|---|
| 2,754,192 | 7/1956 | Bray. |
| 2,891,856 | 6/1959 | Getsinger et al. |
| 2,963,359 | 12/1960 | Moore et al. |
| 3,011,875 | 12/1961 | Sumner. |
| 3,130,033 | 4/1964 | Stephens. |

DONALL H. SYLVESTER, *Primary Examiner.*

G. W. RUTHERFORD, *Assistant Examiner.*